Patented Jan. 9, 1951

2,537,021

UNITED STATES PATENT OFFICE 2,537,021

INSECT REPELLENTS

Paul D. Bartlett, Weston, and Sidney D. Ross, North Adams, Mass., assignors to the United States of America as represented by the Secretary of the Army No Drawing. Application January 7, 1949, Serial No. 69,832

3 Claims. (Cl. 167—33)

This invention relates to insect repellents.

We have found that the application of a solution of 1-furyl-2,2-dimethyl-1,3-propanediol (a compound having the structural formula

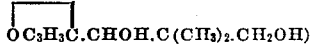

in dimethyl phthalate to the human skin affords effective protection against insect bites, by repelling insects, particularly Aedes aegypti and Anopheles quadrimaculatus.

A number of tests to measure the repellency of 1-furyl-2,2-dimethyl-1,3-propanediol in dimethyl phthalate against Aedes aegypti was conducted by smearing the compound on the arms of test personnel, who then thrust their arms into cages containing Aedes aegypti. The arms were exposed for 30-minute intervals at 3 minutes each until the first insect bite.

It was found that the application of a 41% solution of 1-furyl-2,2-dimethyl-1,3-propanediol in dimethyl phthalate to the skin affords protection against Aedes aegypti for an average of 231 minutes. Against Anopheles quadrimaculatus, an average repellency time of 43 minutes was noted in analogous tests.

A number of comparative tests of the performance of a 41% solution of 1-furyl-2,2-dimethyl-1,3-propanediol in dimethyl phthalate on the one hand, and of dimethyl phthalate on the other hand showed that the former upon application to the skin repelled Aedes aegypti for 316 minutes and the latter for 241 minutes. These comparative tests were carried out by smearing the respective compositions on the left and the right arm of the test person, who then inserted both arms into one cage containing Aedes aegypti. As in the test above described, both arms were exposed simultaneously for 30-minute intervals at 3 minutes each, and the first insect bite on each arm was noted.

For ease of application to the skin, the solution of 1-furyl-2,2-dimethyl-1,3-propanediol in dimethyl phthalate (e. g. on the order of 41% strength) may be further incorporated in a suitable inert liquid or solid carrier such as mineral oil, alcohol, petrolatum, etc.

Having thus described our invention, we claim:

1. An insect repellent composition comprising a solution of 1-furyl-2,2-dimethyl-1,3-propanediol in dimethyl phthalate.

2. An insect repellent composition comprising a solution of 1-furyl-2,2-dimethyl-1,3-propanediol in dimethyl phthalate, in an inert non-gaseous organic carrier.

3. An insect repellent composition comprising a solution of 1-furyl-2,2-dimethyl-1,3-propanediol in dimethyl phthalate, said solution having a strength on the order of 41%.

PAUL D. BARTLETT.
SIDNEY D. ROSS.

REFERENCES CITED

The following references are of record in the file of this patent:

UNITED STATES PATENTS

| Number | Name | Date |
|---|---|---|
| 2,356,801 | Travis | Aug. 29, 1944 |
| 2,396,013 | Jones | Mar. 5, 1946 |
| 2,407,205 | Wilkes | Sept. 3, 1946 |
| 2,413,803 | Tribit | Jan. 7, 1947 |

OTHER REFERENCES

OSRD Insect Control Committee Report No. 28, Interim Report No. 0-94, May 18, 1945; particularly page 37, Orlando No. 0-5739, 2,2-dimethyl-trimethylene glycol-1,3.

Beilstein, "Handbuch d. Org. Chem." 4th ed., vol. 17, page 155, entry 2-(d-dioxy-B.B.-dimethyl-propyl)-furan.